United States Patent
Lee et al.

(10) Patent No.: US 12,096,752 B2
(45) Date of Patent: Sep. 24, 2024

(54) PET LEASH AND COLLAR SYSTEMS

(71) Applicant: Halridge Trading Ltd., Burnaby (CA)

(72) Inventors: Trevor Lee, Vancouver (CA); Simon Levine, Vancouver (CA)

(73) Assignee: Halridge Trading Ltd.

(*) Notice: Subject to any disclaimer, the term of this patent is extended or adjusted under 35 U.S.C. 154(b) by 191 days.

(21) Appl. No.: 17/723,192

(22) Filed: Apr. 18, 2022

(65) Prior Publication Data

US 2022/0330526 A1    Oct. 20, 2022

Related U.S. Application Data

(60) Provisional application No. 63/177,252, filed on Apr. 20, 2021.

(51) Int. Cl.
*A01K 27/00* (2006.01)
*E05B 73/00* (2006.01)

(52) U.S. Cl.
CPC ........ *A01K 27/005* (2013.01); *E05B 73/0005* (2013.01)

(58) Field of Classification Search
CPC .......................... A01K 27/005; E05B 73/0005
See application file for complete search history.

(56) References Cited

U.S. PATENT DOCUMENTS

| | | |
|---|---|---|
| 3,867,905 A | 2/1975 | Vail, Jr. |
| 4,398,500 A | 8/1983 | Koronkiewicz |
| 5,408,729 A | 4/1995 | Schwartz et al. |
| 6,095,094 A | 8/2000 | Phillips |
| 6,227,015 B1 | 5/2001 | Luquire |
| 6,532,903 B2 | 3/2003 | Prusia et al. |
| 6,581,548 B1 | 6/2003 | Reid |
| 6,629,440 B1 | 10/2003 | Meekma et al. |
| 7,066,113 B2 | 6/2006 | Cheng et al. |
| 8,683,959 B2 | 4/2014 | Friedland |
| 9,032,764 B2 | 5/2015 | Yeh |
| 9,388,606 B2 | 7/2016 | Garthe et al. |
| 9,433,188 B2 | 9/2016 | Cuthbertson et al. |
| 9,663,975 B2 | 5/2017 | Castro et al. |
| D902,009 S * | 11/2020 | Yang ............................. D8/356 |
| 2009/0229537 A1 * | 9/2009 | Muelken .............. A01K 27/004 119/792 |
| 2011/0056050 A1 | 3/2011 | Hassing |

(Continued)

FOREIGN PATENT DOCUMENTS

| | | |
|---|---|---|
| AT | 512310 | 7/2013 |
| CA | 2701800 | 11/2011 |

(Continued)

*Primary Examiner* — Tien Q Dinh
*Assistant Examiner* — Katherine June Bolek
(74) *Attorney, Agent, or Firm* — Fish & Richardson P.C.

(57) ABSTRACT

A pet collar for preventing pet theft includes a latch assembly selectively movable between an open position and a closed position. The latch assembly has a front plate cover, a back plate cover, a cam pivotally secured to and positioned in between the front and back plate covers, a first eye extending from a surface of the front plate cover, and a second eye extending from a surface of the cam. The latch assembly includes a cord having a first end secured to the latch assembly and a second end secured to a portion of the cord. The cord extends through a channel defined by the front and back plate covers.

23 Claims, 8 Drawing Sheets

(56) References Cited

U.S. PATENT DOCUMENTS

| | | | |
|---|---|---|---|
| 2011/0277700 A1 | 11/2011 | Friedland | |
| 2011/0315090 A1* | 12/2011 | Marshall | A01K 27/004 |
| | | | 119/796 |
| 2013/0008752 A1 | 1/2013 | Avganim et al. | |
| 2013/0174616 A1 | 7/2013 | Allen, Jr. | |
| 2015/0000613 A1 | 1/2015 | Cooke | |
| 2015/0033542 A1* | 2/2015 | Miron | A01K 27/005 |
| | | | 29/515 |
| 2017/0020112 A1 | 1/2017 | Shaver et al. | |
| 2017/0142934 A1* | 5/2017 | Evans | H02J 50/12 |
| 2018/0332828 A1* | 11/2018 | McConnell | A01K 27/005 |
| 2022/0330526 A1* | 10/2022 | Lee | E05B 73/0005 |

FOREIGN PATENT DOCUMENTS

| | | | | |
|---|---|---|---|---|
| DE | 202015003650 | | 7/2015 | |
| GB | 2413928 | | 11/2005 | |
| WO | WO2014026209 | | 2/2014 | |
| WO | WO-2015011463 A1 * | | 1/2015 | E05B 67/003 |

\* cited by examiner

PET LEASH AND COLLAR SYSTEMS

CROSS-REFERENCE TO RELATED APPLICATION

This application claims the benefit of priority to U.S. Provisional Patent Application No. 63/177,252, filed on Apr. 20, 2021, which is hereby incorporated by reference in its entirety.

TECHNICAL FIELD

This invention generally relates to pet leash and collar systems, and more particularly to pet leash and collar systems for preventing pet theft.

BACKGROUND

Pet theft has been increasing in recent years worldwide, and the number of pet theft incidents continues to grow. Pet theft often occurs while pets are left unattended outside in a public location (e.g., a shop, a restaurant, or the like), in a car, or in an accessible part of a residential property (e.g., a front yard or a back yard). Conventional pet leashes and/or collars fail to provide a way to secure a companion animal from theft. Conventional pet leashes are often composed of materials that can easily be cut and/or lack any type of locking device. Therefore, it can be beneficial for pet owners to securely tether their pets when out in public and/or while left unattended such that only an authorized user is able to remove the leash from the pet collar and/or remove the leash from the object to which it is tethered to in order to effectively prevent pet theft when they are away from their pets for a period of time.

SUMMARY

In general, this disclosure relates to pet leash and collar systems. Such pet leash and collar systems are designed to be theft-preventative and are advantageously size-adjustable. In one aspect, a pet collar for preventing pet theft includes a latch assembly selectively movable between an open position and a closed position, the latch assembly having a front plate cover, a back plate cover, a cam pivotally secured to and positioned in between the front and back plate covers, a first eye extending from a surface of the front plate cover, and a second eye extending from a surface of the cam. The pet collar further includes a cord having a first end secured to the latch assembly and a second end secured to a portion of the cord, the cord extending through a channel defined by the front and back plate covers, wherein in the closed position: i) the cam is configured to engage the cord and prevent the cord from sliding through the channel, and ii) the first eye is configured to align with the second eye, the first and second eyes configured to receive a lock when aligned, and wherein in the open position: i) the cord is configured to be slid through the channel, and ii) the first eye is configured to not align with the second eye.

Embodiments may include one or more of the following features.

In some embodiments, the pet collar further includes a leash including the lock configured to be received by the first and second eyes.

In certain embodiments, the lock is a combination lock.

In some embodiments, the lock is a locking carabiner comprising a swivel, rotating ring.

In certain embodiments, the pet collar further includes an end retainer configured to secure the second end of the cord to the portion of the cord.

In some embodiments, the latch assembly further includes a recess configured to receive the first end of the cord.

In certain embodiments, the recess includes ridged edges configured to facilitate securing the first end of the cord.

In some embodiments, the cam includes teeth configured to engage the cord.

In certain embodiments, the cam defines a cam hole configured to be pivotally mounted to a pivot of the latch assembly.

In some embodiments, the channel includes a cord-engaging portion having a plurality of ridges configured to engage the cord, the cord-engaging portion being opposite the teeth of the cam when in the closed position.

In certain embodiments, the plurality of ridges is defined throughout the surface of the cord-engaging portion of the channel.

In some embodiments, the front and back plate covers are composed of metal or a rigid plastic.

In another aspect, a pet leash and collar system for preventing pet theft, includes a pet collar including a latch assembly selectively movable between an open position and a closed position, the latch assembly having a front plate cover, a back plate cover, a cam pivotally secured to and positioned in between the front and back plate covers, a first eye extending from a surface of the front plate cover, and a second eye extending from a surface of the cam; and a cord having a first end secured to the latch assembly and a second end secured to a portion of the cord, the cord extending through a channel defined by the front and back plate covers. The pet leash and collar system further includes a leash having a first end comprising a handle and a second end comprising a lock configured to be received by the first and second eyes.

In some embodiments, the lock is a locking carabiner including a swivel, rotating ring.

In certain embodiments, the locking carabiner includes a combination lock.

In some embodiments, the lock is a combination lock.

In certain embodiments, the handle further includes a securing element having a loop configured to receive a connector.

In some embodiments, the connector is a lock or a locking carabiner including a swivel, rotating ring.

In certain embodiments, the pet collar further includes an end retainer configured to secure the second end of the cord to the portion of the cord.

In some embodiments, the latch assembly further includes a recess configured to receive the first end of the cord.

In certain embodiments, the recess includes ridged edges configured to facilitate securing the first end of the cord.

In some embodiments, the cam includes teeth configured to engage the cord.

In certain embodiments, the cam defines a cam hole configured to be pivotally mounted to a pivot of the latch assembly.

In some embodiments, the channel includes a cord-engaging portion defining a plurality of ridges configured to engage the cord, the cord-engaging portion being opposite the teeth of the cam when in the closed position.

Embodiments may provide one or more of the following advantages.

In some embodiments, the latch assembly defines a channel through which the cord of the collar can be slid through, thereby providing the collar with size adjustability. Accordingly, a user (e.g., a pet owner, a pet trainer, or the like) can reduce or increase the circumference of the collar as desired, configuring the collar to conform to a wide range of neck sizes.

In some embodiments, the pet collar and leash can be separable. The latch assembly features a cam and two overlapping eyes configured to receive a loop (e.g., a snap hook, a shackle of a padlock, a basket of a carabiner, etc.) that fixes the collar at a particular circumference or size in place. Additionally, the loop may be further optionally connected to a leash. Thus, the latch assembly provides the user (e.g., a pet owner, a pet trainer, or the like) the option to leave the collar on the pet with or without a leash connected to the collar.

In some embodiments, the cord of the collar and leash is cut-resistant and abrasion-resistant. The cord is composed of a steel wire encased in plastic and further surrounded by a nylon sheath. Therefore, the design and composition of the cord of the pet collar and leash can prevent an individual from easily cutting through the cord. In some embodiments, the cord is durable as its design and composition prevents a pet from easily chewing on and potentially damaging the cord.

In some embodiments, the pet collar and leash are configured to be secured to each other with a locking carabiner that prevents unwanted removal of the leash from the pet collar (e.g., during a pet theft). Furthermore, in some embodiments, a locking carabiner is configured to attach to a securing element disposed at one end of the leash, which can prevent unwanted removal of the leash from the object to which it is tethered to. The locking carabiner includes a 3-dial combination lock that can provide the user with ease of use and convenience as a key is not required.

The locking carabiner further includes a swivel eye that can allow for increased maneuverability and freedom of movement as the eye swivels around the bolt of the locking carabiner, allowing the leash attached through the eye to rotate as the pet moves.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
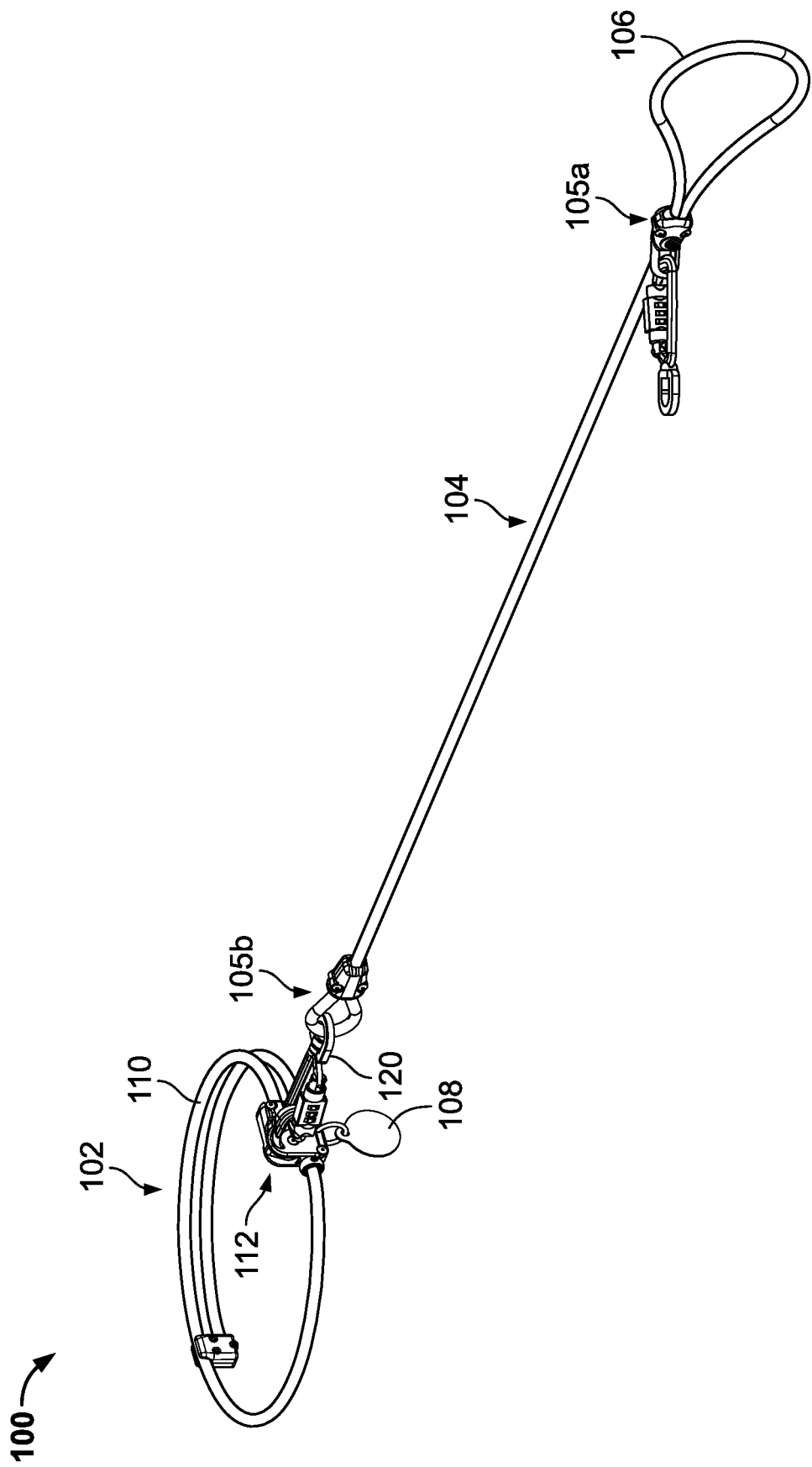
FIG. 1 is a perspective view of a pet leash and collar system.

FIG. 1 illustrates a pet leash and collar system 100 in an assembled state. The pet leash and collar system 100 includes a collar 102 and a leash 104. The collar 102 includes a latch system 112 and a cord 110. The collar 102 can optionally include a tag 108 (e.g., a pet identification tag) that is removably secured to the latch assembly 112. The leash 104 extends between a proximal end 105a and a distal end 105b and further includes a handle 106 at the proximal end 105a. The leash 104 can be removably secured to the collar 102 at the distal end 105b via a carabiner 120. The latch assembly 112 is typically made of one or more suitable plastic materials that are rigid (e.g., acrylonitrile butadiene styrene (ABS), polypropylene (PP), polyvinyl chloride (PVC), thermoplastic elastomer (TPE), polyoxymethylene (POM), and/or polyethylene (PE)) or one or more metallic materials. The latch assembly 112 can be typically manufactured primarily via extrusion, molding, casting, machining, and/or three-dimensional printing. The cord 110 includes a steel wire encased in plastic and further surrounded by a sheath (e.g., a nylon sheath). In some embodiments, the pet leash and collar system can include components that are made of a suitable metal (e.g., aluminum and/or a zinc alloy) and/or a suitable plastic (e.g., acrylonitrile butadiene styrene (ABS), polypropylene (PP), polyvinyl chloride (PVC), thermoplastic elastomer (TPE), polyoxymethylene (POM), and/or polyethylene (PE)).

Figure 2:
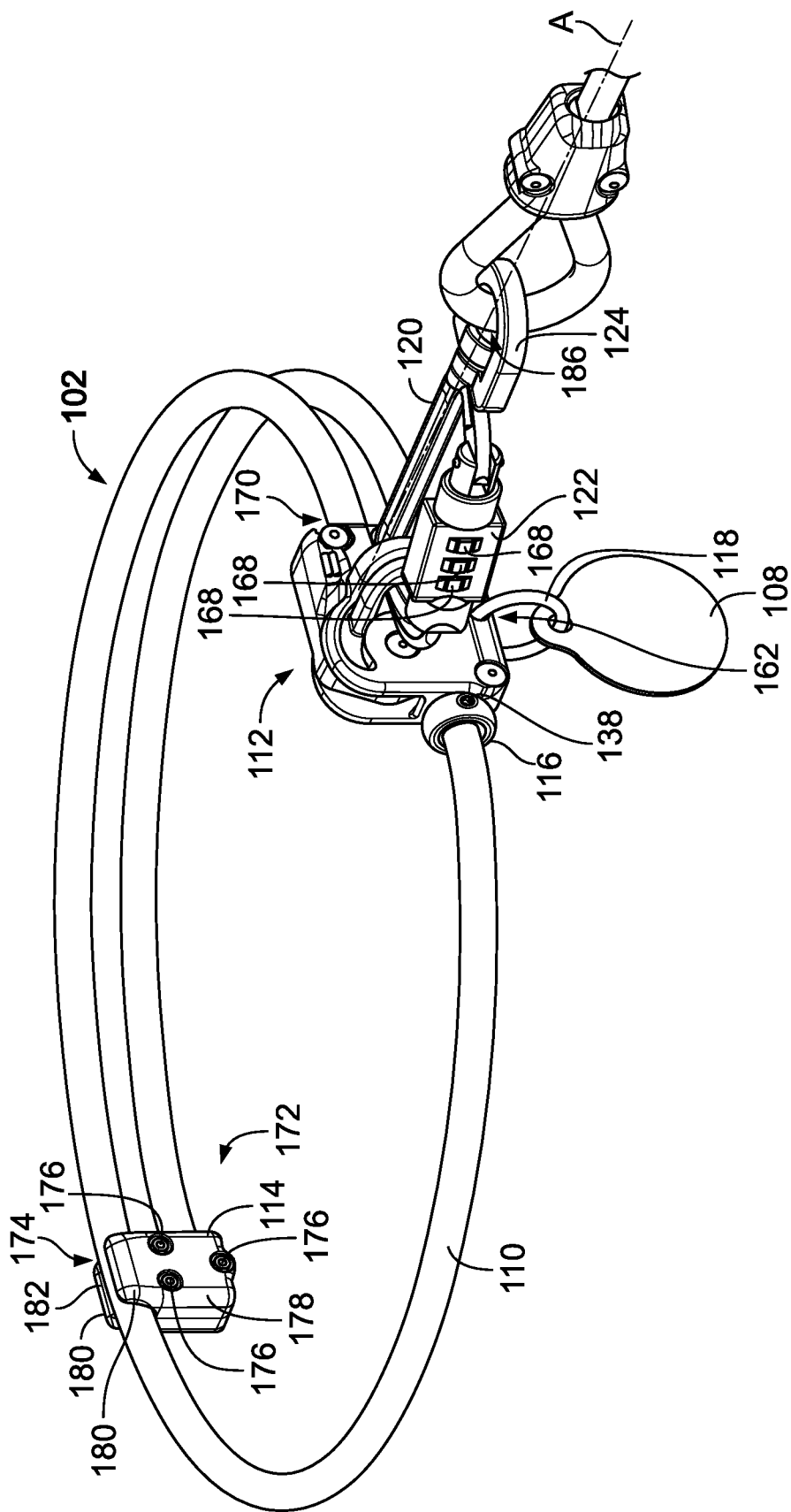
FIG. 2 is a perspective view of a pet collar of the pet leash and collar system of FIG. 1.

Referring to FIG. 2, the collar 102 includes the cord 110 having a first end 170 that is secured to the latch assembly 112 and a second end 172 that is secured to a retainer 114. The retainer 114 has a generally rectangular outer profile with a substantially rectangular body 178 integral with a pair of opposed upstanding arms 180 that extend from the body 178 to a top surface 182 of the retainer 114. The retainer arms 180 form a U-shaped cradle and define a channel 174 between the retainer arms 180 along which a portion of the cord 110 may be slid. The channel 174 includes an upper opening and a lower seat having substantially the same radius as the cord 110 for operably and snugly receiving the cord 110. The retainer channel 174 is an open, U-shaped channel. In some embodiments, the retainer channel 174 may be a closed or cylindrical channel.

The retainer 114 defines a retainer hole through which the second end 172 of the cord 110 is inserted and fixedly secured. The second end 172 of the cord 110 is fixedly secured to the retainer 114 via one or more fasteners 176 (e.g., rivets). The retainer includes two component parts (e.g., a front plate and a back plate) that are assembled and fixedly joined via fasteners 176 (e.g., rivets) that traverse the two component parts. In some embodiments, fasteners 176 are stainless steel rivets. When assembled, the retainer 114 defines a hole that receives the second end 172 of the cord 110. The second end 172 of the cord 110 is sandwiched between the front and back plates of the retainer 114 and fixedly secured therein by the fasteners 176. The second end 172 of the cord 110 is fixedly secured to the retainer 114 such that removal of the second end 172 from the hole of the retainer 114 is prevented. In some embodiments, the second end 172 of the cord 110 may be irreversibly adhered to the opening of the retainer 114 (e.g., by use of an epoxy resin). In some embodiments, the second end 170 of the cord 110 may be fixedly secured to the retainer 114 via a mechanical fastener (e.g., rivets, screws, pins, bolts, or the like), welding (e.g., ultrasonic welding of retainer components may fixedly secure the second end 170 of the cord 110), adhesive bonding (e.g., adhesive bonding of retainer components may fixedly secure the second end 170 of the cord 110), or any combination thereof.

The cord 110 loops or coils from the first end 170 to the second end 172 to form a ring or a circular shape. A first portion of the cord 110 between the first end 170 and the second end 172 is slid through the retainer channel 174 of the retainer 114. A second portion of the cord 110 between the first end 170 and the second end 172 is slid through the latch assembly 112 and secured by a donut stopper 116 defining an aperture through which the cord 110 is slid therethrough. The donut stopper 116 is secured to the cord 110 by a fastener 138 (e.g., a screw) that traverses a hole in the donut stopper 116. The fastener 138 secures the donut stopper 116 to the cord 110 by sufficiently abutting the surface of the cord 110 such that sliding of the cord 110 through the aperture of the donut stopper 116 is permitted yet movement of the donut stopper 116 along the cord 110 and/or rotation of the donut stopper 116 about the cord 110 is inhibited.

The user (e.g., a pet owner, a pet trainer, or the like) can adjust the circumference of the cord 110 by sliding the cord 110 through the retainer channel 174 and the latch assembly 112, while the latch assembly is in an open position, until a desired circumference is obtained. The desired circumference can then be fastened securely in position by switching the latch assembly 112 to a closed position. The user can then use the carabiner 120 received by the latch assembly 112, as shown in FIG. 2, or a lock, to lock the latch assembly 112 in place. The carabiner 120 can be a locking carabiner including a lock 122 (e.g., a combination lock) having three dials 168. In some embodiments, the lock 122 may have 4, 5, or more dials. In some embodiments, the lock 122 includes three or more dials, each dial having a number, letter, symbol or a combination thereof. The carabiner 120 includes a swivel eye 124 defining an aperture 186 therethrough. The swivel eye 124 is free to swivel 360 degrees or more about an axis A. The aperture 186 can receive a distal end 105b of leash 104. In some embodiments, the swivel eye 124 is a swivel D-ring attachment. The latch assembly 112 further defines a hole 162 that receives a ring 118 of a tag 108 (e.g., a pet identification tag).

Figure 3:
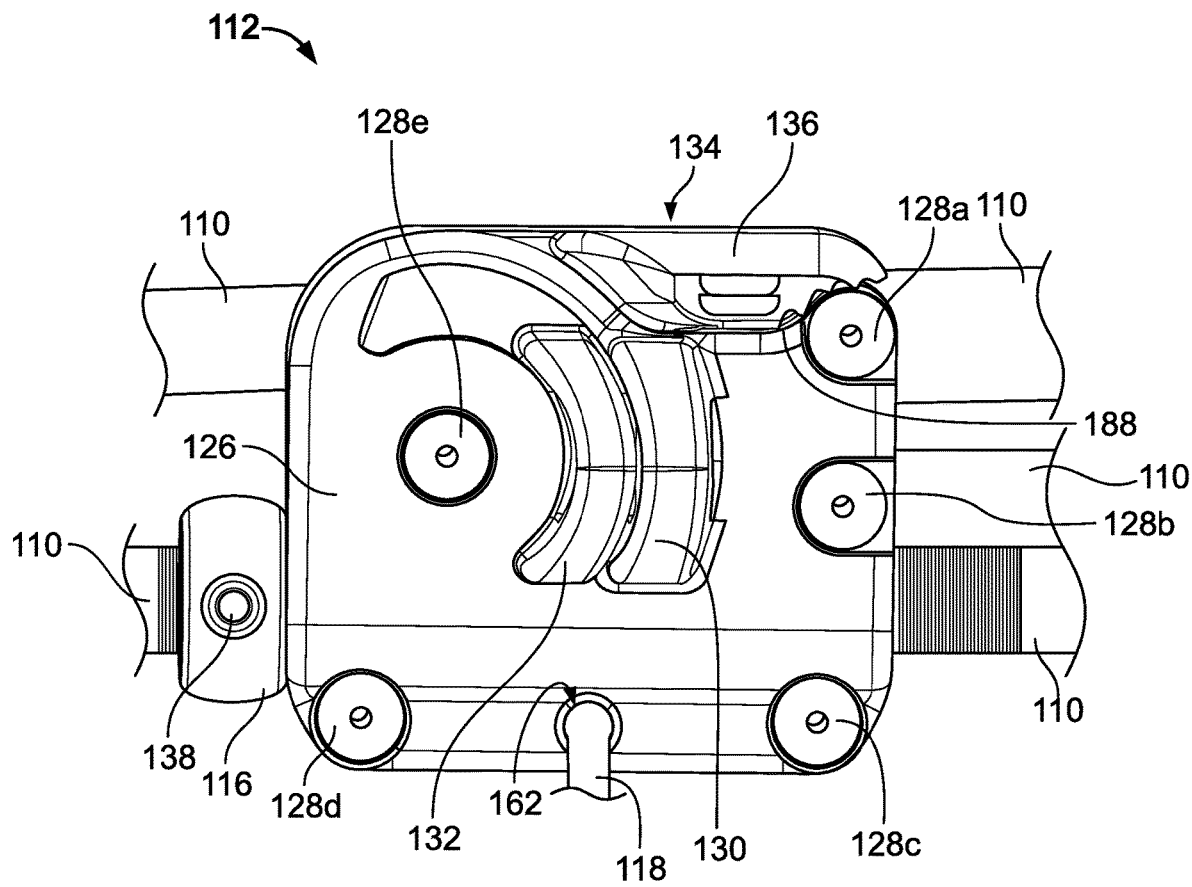
FIG. 3 is a front view of a latch assembly of the pet collar and leash system of FIG. 1 in a closed position.

The latch assembly 112 is selectively movable between an open position and a closed position. FIG. 3 shows the latch assembly 112 in a closed position. The latch assembly 112 has a front plate cover 126 and a back plate cover that are assembled and fixedly joined via first, second, third, fourth, and fifth fasteners 128a, 128b, 128c, 128d, 128e (e.g., rivets) that traverse both the front and back plate covers. In some embodiments, the front plate cover 126 of the latch assembly 112 may be irreversibly adhered to the back plate cover (e.g., by use of an epoxy resin). In some embodiments, the front plate cover 126 of the latch assembly 112 may be fixedly secured to the back plate cover via a mechanical fastener (e.g., rivets, screws, pins, bolts, or the like), welding (e.g., ultrasonic welding), adhesive bonding (e.g., epoxy resin), or any combination thereof.

The latch assembly 112 includes a cam 134 that is pivotally secured to and positioned in between the front plate cover 126 and the back plate cover of the latch assembly 112. A first eye 130 extends from a surface of the front plate cover 126 and defines a first aperture therethrough, and a second eye 132 extends from a surface of the cam 134 and defines a second aperture therethrough. The first eye 130 and the second eye 132 are substantially semicircular in shape (e.g., include C-shaped protrusions) and have complementary shapes such that when the latch assembly is in a closed position, as shown in FIG. 3, the first eye 130 (e.g., the first aperture of the first eye 130) is configured to align with the second eye 132 (e.g., the second aperture of the second eye 132). The first and second eyes 130, 132 are not aligned when the latch assembly is in an open position. When the first and second eyes 130, 132 are aligned, the first and second apertures of the first and second eyes 130, 132 can receive the carabiner 120. In some embodiments, the first and second apertures of the first and second eyes 130, 132 can receive a loop (e.g., a shackle of a padlock or a basket of a carabiner). In some embodiments, the first and second apertures of the first and second eyes 130, 132 can receive a loop further attached to a leash. The cam 134 includes a cam arm 136 configured to rest on a top surface 188 of the latch assembly 112 when the latch assembly is in a closed position. The cam 134 is configured to engage the cord 110 and prevent the cord from sliding through the latch assembly 112 when the latch assembly 112 is in a closed position.

Figure 4:
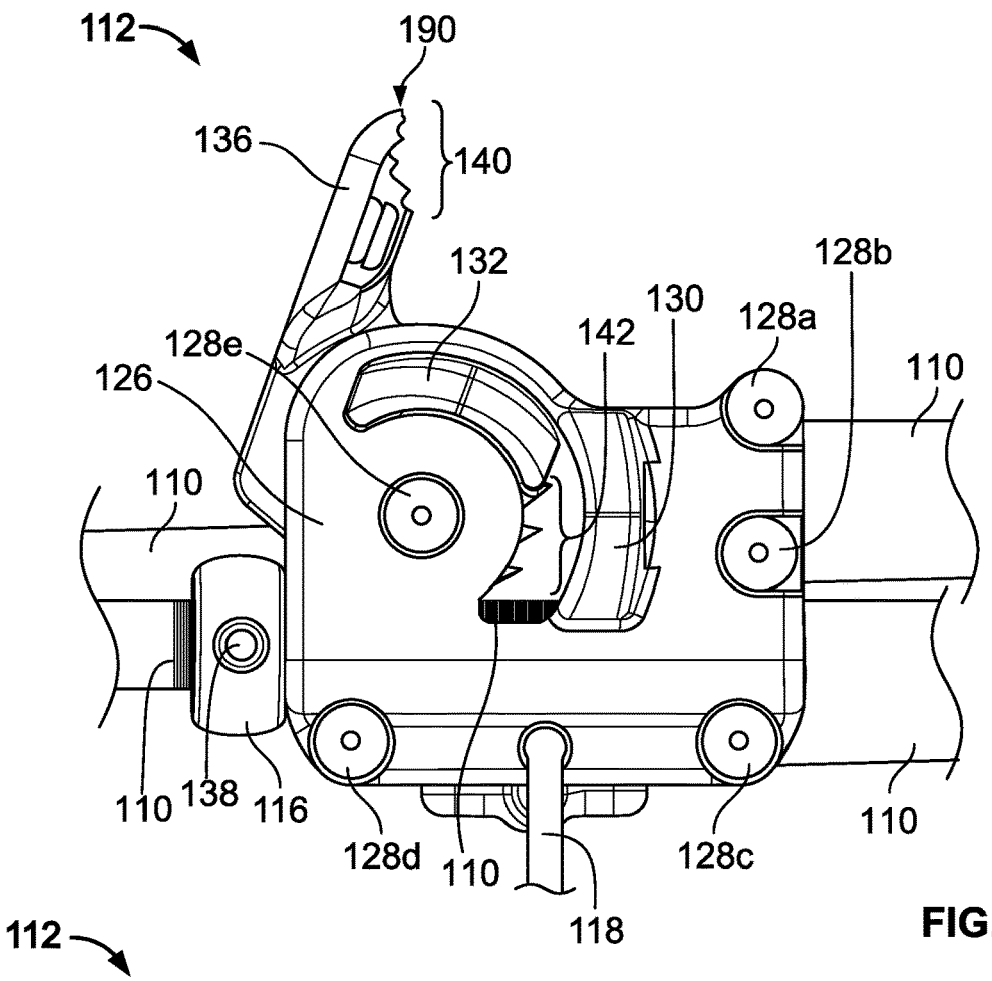
FIG. 4 is a front view of the latch assembly of the pet collar and leash system of FIG. 1 in an open position.

Referring to FIG. 4, the latch assembly 112 is shown in an open position. The cam arm 136 has serrations 140 at an end 190 of cam arm 136. Serrations 140 contact the first fastener 128a when the latch assembly is in a closed position. Serrations 140 can provide a gripping surface for the user to more easily manipulate the cam arm 136. The cam arm 136 is pivotably mounted with respect to the fifth fastener 128e, which acts as a pivot point, and the cam arm 136 moves along a movement profile between the open and closed positions of the latch assembly 112.

Figure 5:
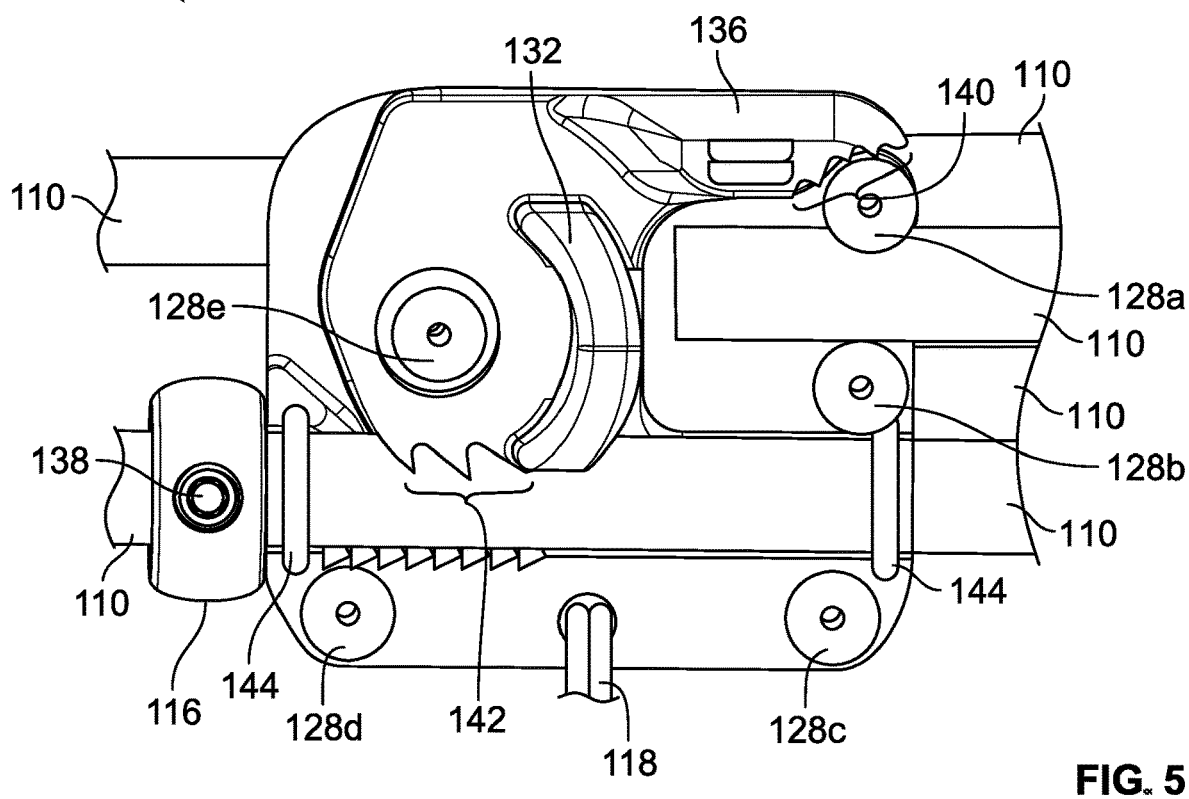
FIG. 5 is a partial, cross-sectional view of the latch assembly of FIG. 3 in a closed position.

FIG. 5 shows a partial, cross-sectional view of the latch assembly 112 in a closed position. A portion of the cam 134 adjacent to the second eye defines a plurality of teeth 142 configured to engage the cord 110 when the latch assembly is in a closed position. The plurality of teeth 142 have a triangular profile. In some embodiments, the plurality of teeth 142 may have a profile including a variety of different shapes other than triangular (e.g., a rectangular profile). The plurality of teeth 142 can be spaced at a first pitch, and the serrations 140 can be spaced at a second pitch. The first pitch can be different than the second pitch. In some embodiments, the first pitch is less than the second pitch. In some embodiments, the first pitch is greater than the second pitch. The latch assembly 112 includes a pair of O-rings 144 each defining an aperture receiving the cord 110. The O-rings 144 are secured to opposing sides of the latch assembly 112 to snuggly receive the cord 110 as it enters and exits the latch assembly 112.

Figure 6:
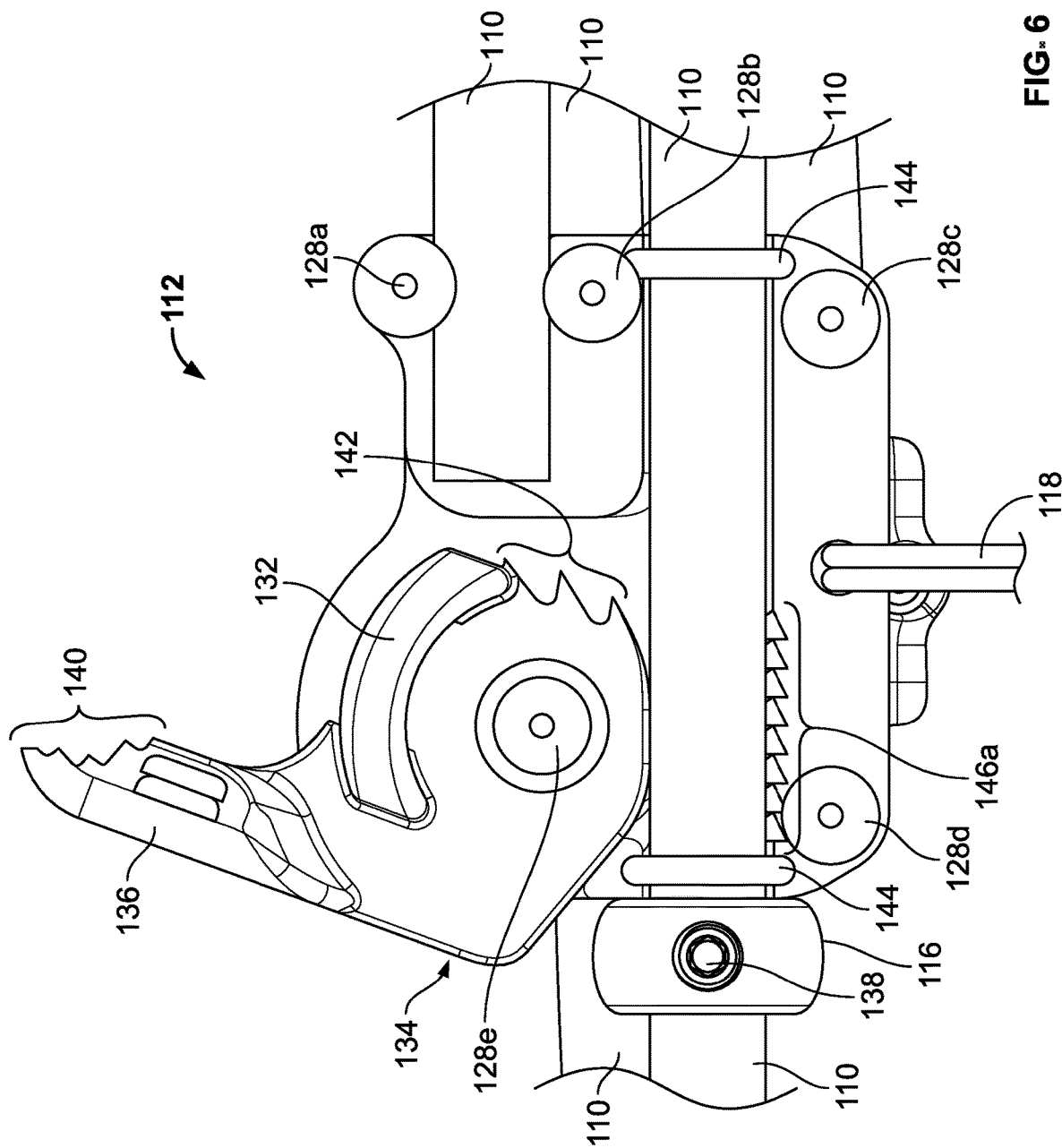
FIG. 6 is a partial, cross-sectional view of the latch assembly of FIG. 3 in an open position.

FIG. 6 shows a partial, cross-sectional view of the latch assembly 112 in an open position. A first portion of the front plate cover 126 and the back plate cover (e.g., a cord-engaging portion) define a first plurality of ridges 146a that increase the friction or grip of the cord 110 as the cord 110 is slide through the latch assembly 112. The first portion of the front plate cover 126 and the back plate cover defining the first plurality of ridges 146a surrounds the portion of the cord 110 that is engaged with the plurality of teeth 142 of the cam 134 when the latch assembly is in a closed position. The plurality of ridges 146 is disposed at opposing sides of the plurality of teeth 142.

Figure 7:
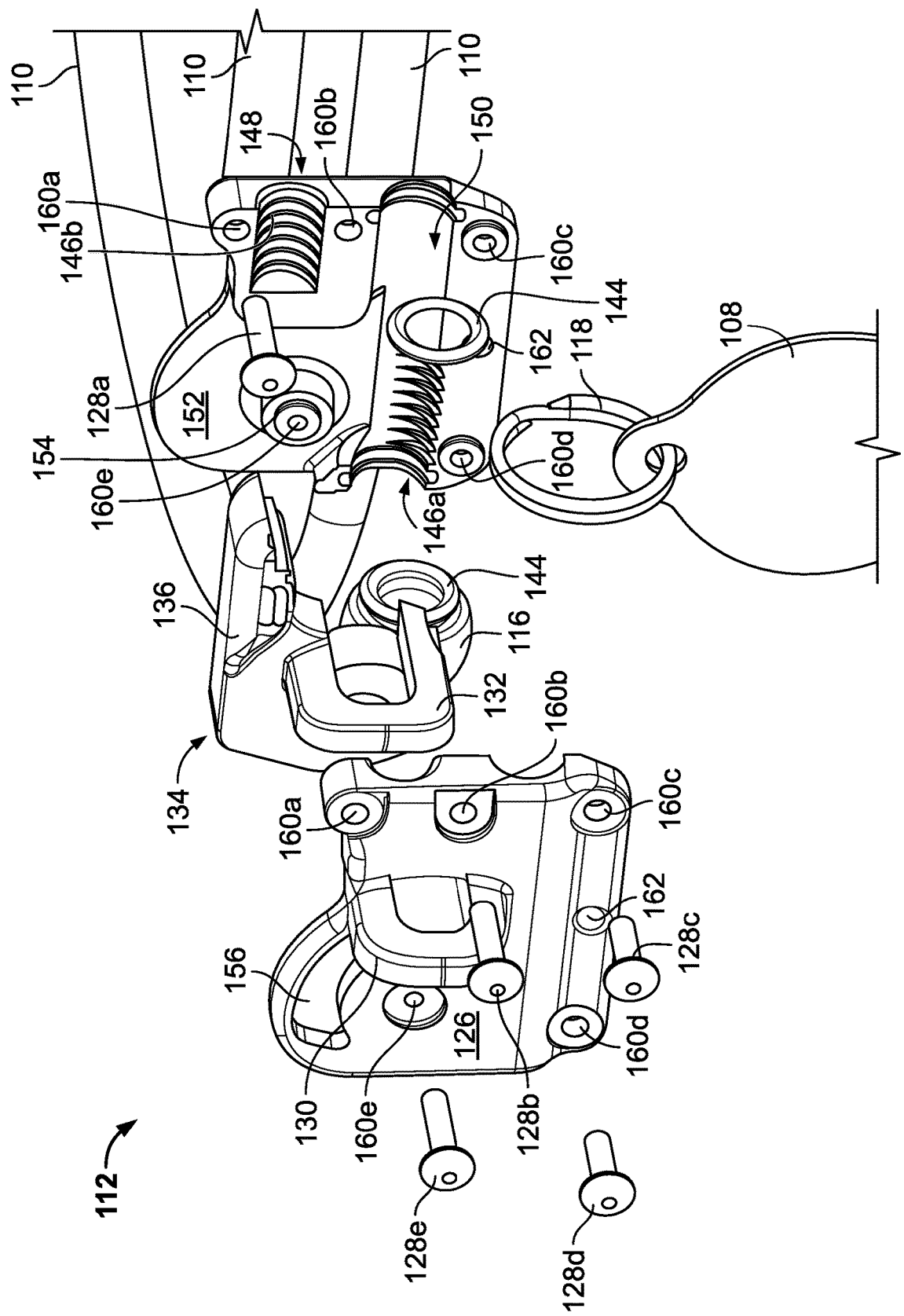
FIG. 7 is a front, exploding view of the latch assembly of FIG. 3.
Figure 8:
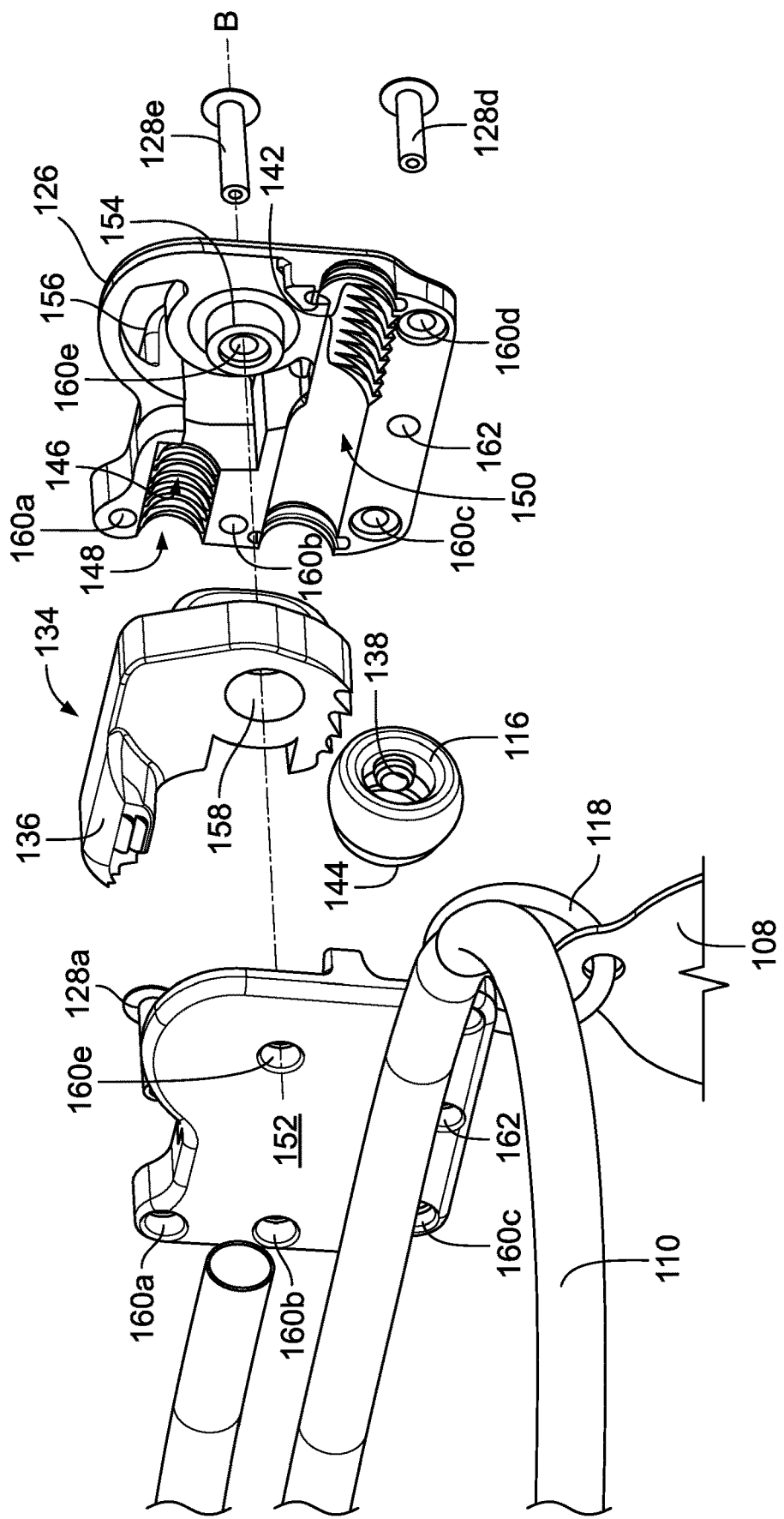
FIG. 8 is a back, exploding view of the latch assembly of FIG. 3.

Referring to FIGS. 7 and 8, a front and back exploding views of the latch assembly 112, respectively, are shown. A second portion of the front cover plate 126 and the back cover plate 152 define a second plurality of ridges 146b. This second portion of the front cover plate 126 and the back cover plate 152 is a recess 148 that receives the first end 170 of the cord 110. The second plurality of ridges 146b increases the friction or grip of the cord 110 to help secure and maintain the first end 170 in place (e.g., to prevent the first end 170 from exiting the recess 148). The front and back cover plates 126, 152 define a channel 150 in which the cord 110 is received and slid through. The channel 150 includes the first portion of the front and back cover plates 126, 152 defining the first plurality of ridges 146a. The first plurality of ridges 146a are defined throughout a surface of channel 150 at the first portion of the front and back cover plates 126, 152.

The front cover plate 126 defines first, second, third, fourth, and fifth holes 160a, 160b, 160c, 160d, and 160e that receive the first, second, third, fourth, and fifth fasteners 128a, 128b, 128c, 128d, and 128e. The back cover plate 152 defines first, second, third, and fourth holes 160a, 160b, 160c, and 160d that receive the first, second, third, and fourth fasteners 128a, 128b, 128c, and 128d. The fifth hole 160e is defined by the front and back plate covers 126, 152 at the center of pivot 154. The pivot 154 has two raised, cylindrical shapes that are each integral with each inner surfaces of the front and back plate covers 126, 152. Pivot 154 has two identical body components that are aligned with each other. The cam 134 defines a pivot hole 158 therethrough that receives the pivot 154 (i.e., both identical body components of pivot 154). Thus, cam 134 rotates about axis B centered around the pivot 154, as shown in FIG. 8. Furthermore, the fifth fastener 128e is received through the fifth holes 160e defined by the first cover plate 126, the pivot 154 (i.e., both identical body components of pivot 154), and the back cover plate 152.

The front plate cover 126 defines an opening 156 having a semicircular shape. In some embodiments, the opening 156 is a C-shaped opening. The opening 156 is configured to receive the second eye 132 of the cam 134 and provides a movement path for the second eye 132, which has a C-shaped protrusion, between the open and closed positions of the latch assembly 112 (e.g., as the cam arm 136 is moved with respect to the rest of the latch assembly 112). For example, the C-shaped protrusion of the second eye 132 can freely travel through the opening 156 as a user lifts and/or lowers the cam arm 136 to misalign and/or align, respectively, the first and second eyes 130, 132.

Figure 9:
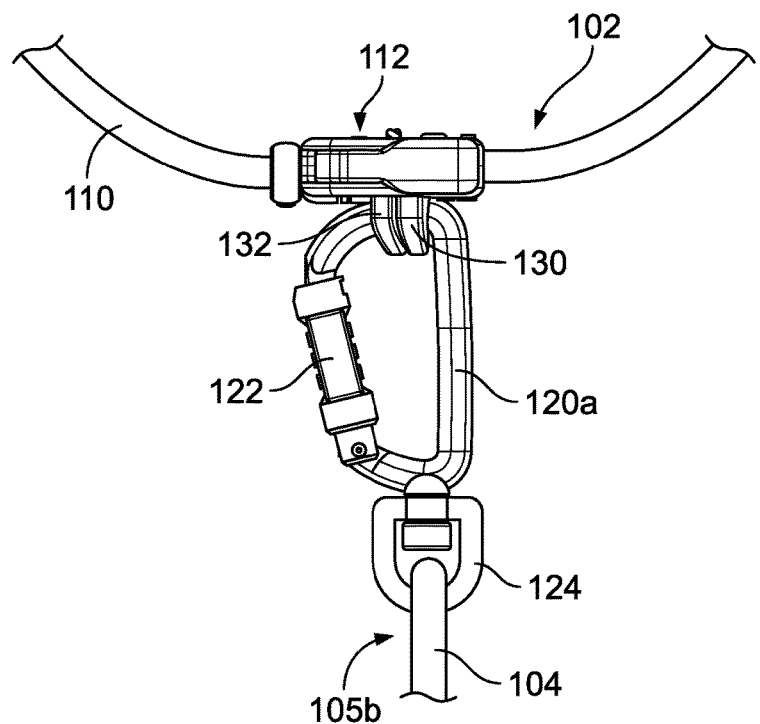
FIG. 9 is a top view of the latch assembly of FIG. 3 and a carabiner.
Figure 10:
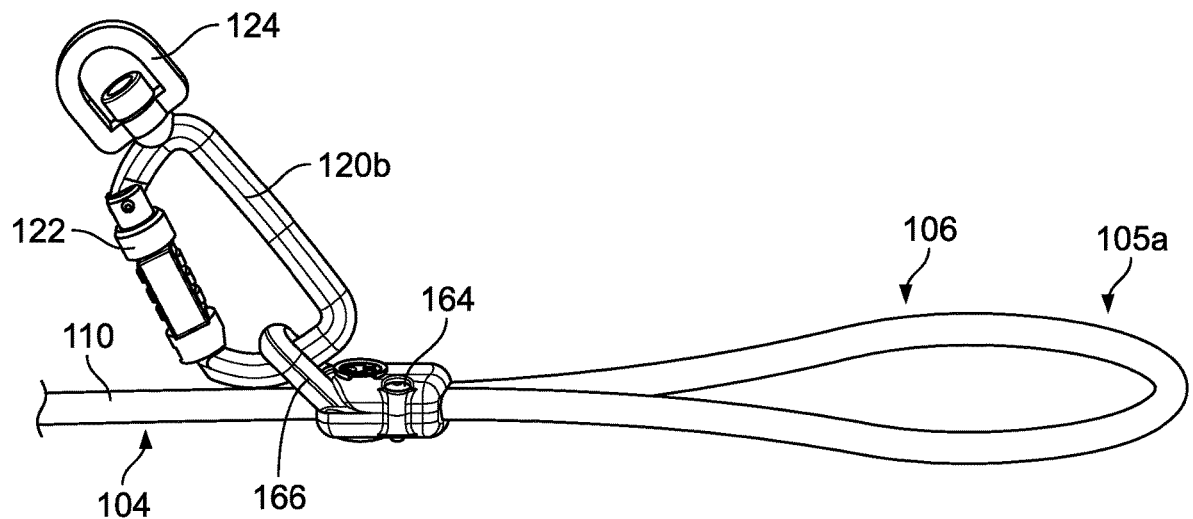
FIG. 10 is a side, perspective view of a handle and a carabiner of the pet leash and collar system of FIG. 1.

Referring to FIGS. 9 and 10, the leash 104 is shown to be attached to the collar 102. The leash 104 is removably attached at the distal end 105b to the collar by the first carabiner 120a that is received through the first and second eyes 130, 132. At the proximal end 105a, the leash 104 includes a leash retainer 164 that connects the cord 110 and the handle 106. The leash retainer 164 may be substantially similar in construction and function in several aspects to the retainer 114 discussed above, but leash retainer 164 can include a loop 166 that can receive a second carabiner 120b. In some embodiments, the loop 166 can receive a carabiner (e.g., without a lock), an eye bolt snap hook, or any other suitable connector. In some embodiments, the second carabiner 120b can facilitate securely tethering of a pet to a stationary object (e.g., a tree, a lamp post, a car seat, etc.) by wrapping the leash 104 around the stationary object and using the second carabiner 120b to lock a first portion of the cord 110 to a second portion of the cord 110 and/or to the first carabiner 120a. In some examples, a pet can be securely tethered to a stationary object without using the second carabiner 120b. For example, in some embodiments, a pet can be securely tethered to a stationary object by wrapping the leash 104 around the fixed object, placing the handle 106 inside the first carabiner 120a, and locking the first carabiner 120a by turning the lock dials. The leash 104 can then be locked and securely attached to both the collar 102 and the fixed object and cannot be unlocked and detached until the lock dials are set back to their unlocked position. In this manner, the pet leash and collar system 100 of the disclosure advantageously deters and helps prevent pet theft.

In some embodiments, an advantage of the pet leash and collar system 100 of the disclosure is the option provided to the user of securing the collar 102 to a pet without having the leash 104 fixedly attached to the collar 102. Thus, the collar 102 can be secured to the pet without needing the leash to also be attached to the collar 102. In this example embodiment, the collar 102 may be secured by using, for example, a carabiner, a locking carabiner, a padlock, etc. that is received by the first and second eyes 130, 132 but does not further include or is connected to a leash.

Alternative Embodiments

While certain embodiments have been described above, other embodiments are possible. For example, while the pet leash and collar system 100 has been described and illustrated as being used with a leash having a fixed length, in some implementations, the pet leash and collar system 100 may be used with a different type of leash having an adjustable length such as a retractable leash. In some embodiments, the pet leash and collar system 100 includes a retractable leash having a retractable system that includes a hook and a cord that retracts automatically into a plastic handle.

While the pet leash and collar system 100 has been described and illustrated as including a leash including a wire encased by a nylon sheath, in some embodiments, a leash that is otherwise substantially similar in construction and function to the leash 104 and/or the collar 102 includes a reflective material to facilitate keeping a pet visible to a driver, for example, in poor lighting conditions (e.g., at night). In some embodiments, the leash and/or collar includes a light source (e.g., a light emitting diode) to also facilitate visibility (e.g., of a pet wearing the pet leashes and/or pet collars of the disclosure) during low-lit conditions or poor lighting conditions (e.g., at night). In some embodiments, the leash is a braided leash. In some embodiments, the leash, collar, and/or the handle of the leash includes padding (e.g., soft foam mesh padding) that provides comfort for both the user (e.g., a pet owner, a pet trainer, or the like) and the pet and provides increased grip.

While the pet leash and collar system 100 has been described and illustrated as including a tag 108, in some embodiments, a pet leash and collar system that is otherwise substantially similar in construction and function to the leash 104 and/or the collar 102 includes a Global Positioning System (GPS) device to facilitate tracking of the pet leash and collar system and/or the pet wearing the pet leash and collar system. In some embodiments, the GPS device includes a GPS module and a power source. In some embodiments, the GPS module includes one or more processors and one or more antennas that are configured to perform trilateration and/or triangulation using radio signals emitted by one or more satellites. In some embodiments, the GPS module uses trilateration and/or triangulation to locate the pet leash and collar system that includes the GPS device. In some embodiments, the pet leash and collar system includes a receiver and/or a wireless transmitter. In some embodiments, the GPS module is configured to receive radio signals from one or more GPS satellites that enable the GPS module to calculate coordinate values indicative of a location of the GPS module. In some embodiments, the power source is a battery (e.g., a rechargeable battery or a non-rechargeable battery). In some embodiments, the GPS module is configured to wirelessly communicate with an electronic device (e.g., a computer, a smartphone, a tablet, or the like). In some embodiments, the GPS module is associated with a software application of an electronic device that allows a user (e.g., a pet owner, a pet trainer, or the like) to identify the GPS coordinates of the pet wearing the pet leash and collar system for locating a lost pest and/or for training purposes. In some embodiments, a pet leash and collar system that is otherwise substantially similar in construction and function to the pet leash and collar system 100 includes a controller and a software application (e.g., a mobile device software application). In some embodiments, the controller includes a power source (e.g., a rechargeable battery or a non-rechargeable battery), one or more processors, and one or more memory units in electronic communication with the one or more processors. In some embodiments, the one or more memory units store instructions that, when executed by the processor, cause the controller to acquire data for an animal wearing the collar, and transmit the acquired data from the controller through a wireless communication system, which may be a cellular network, a wireless local area network, or a wireless personal area network. In some embodiments, the data may include biometric information, location information, movement information, sound information, or the like. In some embodiments, the data is transmitted from the controller to the software application that may reside in a mobile device or a server. In some embodiments, the data is transmitted from the mobile device to the controller. In some embodiments, the software application includes a user interface displaying information (e.g., data received from the controller) and receiving at least one selection (e.g., a selection of an instruction) performed by the user.

In some embodiments, a pet leash and collar system that is otherwise substantially similar in construction and function to the pet leash and collar system 100 includes a wireless alarm device. In some embodiments, the wireless alarm device includes a speaker, battery source (e.g., a rechargeable battery or a non-rechargeable battery), one or more transmitters, and/or one or more receivers. In some embodiments, the wireless alarm device further includes at least one sensor. In some embodiments, the at least one sensor may be configured to detect if the collar is disengaged or removed from a pet while wearing the collar. In some embodiments, the at least one sensor may be configured to detect if the collar and/or leash is moved from a set location by a set distance. For example, in some embodiments, the at least one sensor may detect if the collar and/or leash is moved from a set location by at least 10 feet. In some embodiments, the distance threshold may be set by a user. In some embodiments, the speaker generates a sound or an audible alarm when the at least one sensor detects if the collar is disengaged or removed from a pet while wearing the collar. In some embodiments, the speaker generates a sound or an audible alarm when the at least one sensor detects if the collar is moved from a set location. In some embodiments, the wireless alarm device is in wireless communication with a software application of a mobile device. In some embodiments, the wireless alarm device is in electronic communication with a GPS device of the pet leash and collar system. In some embodiments, the GPS device transmits one or more signals including location information to the wireless alarm device. In some embodiments, the speaker generates a sound or an audible alarm when the location information does not match the set location of the pet leash and collar system.

While a number of examples have been described for illustration purposes, the foregoing description is not intended to limit the scope of the invention, which is defined by the scope of the appended claims. There are and will be other examples and modifications within the scope of the following claims.

What is claimed is:

1. A pet collar for preventing pet theft, the pet collar comprising:
   a latch assembly selectively movable between an open position and a closed position, the latch assembly having a front plate cover, a back plate cover, a cam pivotally secured to and positioned in between the front and back plate covers, a first eye extending from a surface of the front plate cover, and a second eye extending from a surface of the cam; and
   a cord having a first end secured to the latch assembly and a second end secured to a portion of the cord, the cord extending through a channel defined by the front and back plate covers,
   wherein in the closed position: i) the cam is configured to engage the cord and prevent the cord from sliding through the channel, and ii) the first eye is configured to align with the second eye, the first and second eyes configured to receive a lock when aligned, and
   wherein in the open position: i) the cord is configured to be slid through the channel, and ii) the first eye is configured to not align with the second eye.

2. The pet collar of claim 1, further comprising a leash comprising the lock configured to be received by the first and second eyes.

3. The pet collar of claim 2, wherein the lock is a combination lock.

4. The pet collar of claim 2, wherein the lock is a locking carabiner comprising a swivel eye.

5. The pet collar of claim 1, wherein the second end of the cord is secured to the portion of the cord by a retainer defining a hole receiving the second end of the cord.

6. The pet collar of claim 1, wherein the latch assembly further comprises a recess configured to receive the first end of the cord.

7. The pet collar of claim 6, wherein the recess comprises ridged edges configured to facilitate securing the first end of the cord.

8. The pet collar of claim 1, wherein the cam comprises teeth configured to engage the cord.

9. The pet collar of claim 1, wherein the cam defines a cam hole configured to be pivotally mounted to a pivot of the latch assembly.

10. The pet collar of claim 8, wherein the channel comprises a cord-engaging portion having a plurality of ridges configured to engage the cord, the cord-engaging portion being opposite the teeth of the cam when in the closed position.

11. The pet collar of claim 1, wherein the front and back plate covers are composed of metal or a rigid plastic.

12. A pet leash and collar system for preventing pet theft, comprising:
   a pet collar comprising:
      a latch assembly selectively movable between an open position and a closed position, the latch assembly having a front plate cover, a back plate cover, a cam pivotally secured to and positioned in between the front and back plate covers, a first eye extending from a surface of the front plate cover, and a second eye extending from a surface of the cam; and a cord having a first end secured to the latch assembly and a second end secured to a portion of the cord, the cord extending through a channel defined by the front and back plate covers; and a leash having a first end comprising a handle and a second end comprising a lock configured to be received by the first and second eyes.

13. The pet leash and collar system of claim 12, wherein the lock is a locking carabiner comprising a swivel eye.

14. The pet leash and collar system of claim 13, wherein the locking carabiner comprises a combination lock.

15. The pet leash and collar system of claim 12, wherein the lock is a combination lock.

16. The pet leash and collar system of claim 12, wherein the handle further comprises a securing element having a loop.

17. The pet leash and collar system of claim 16, further comprising a connector attached to the loop, the connector comprising a combination lock.

18. The pet leash and collar system of claim 12, wherein the second end of the cord is secured to the portion of the cord by a retainer defining a hole that receives the second end of the cord.

19. The pet leash and collar system of claim 12, wherein the latch assembly further comprises a recess configured to receive the first end of the cord.

20. The pet leash and collar system of claim 19, wherein the recess comprises ridged edges configured to facilitate securing the first end of the cord.

21. The pet leash and collar system of claim 12, wherein the cam comprises teeth configured to engage the cord.

22. The pet leash and collar system of claim 12, wherein the cam defines a cam hole configured to be pivotally mounted to a pivot of the latch assembly.

23. The pet leash and collar system of claim 21, wherein the channel comprises a cord-engaging portion defining a plurality of ridges configured to engage the cord, the cord-engaging portion being opposite the teeth of the cam when in the closed position.

* * * * *